United States Patent [19]
Elmasri et al.

[11] Patent Number: 5,440,730
[45] Date of Patent: Aug. 8, 1995

[54] TIME INDEX ACCESS STRUCTURE FOR TEMPORAL DATABASES HAVING CONCURRENT MULTIPLE VERSIONS

[75] Inventors: Ramez A. Elmasri, Houston, Tex.; Tzyh-Jain G. Wuu, Manalapan, N.J.

[73] Assignee: Bell Communications Research, Inc., Livingston, N.J.

[21] Appl. No.: 564,881

[22] Filed: Aug. 9, 1990

[51] Int. Cl.$^6$ ............................................. G06F 15/40
[52] U.S. Cl. .................................. 395/600; 395/700; 395/486; 364/419.19; 364/282.1; 364/282.3; 364/DIG. 1
[58] Field of Search ............. 395/600, 650, 725, 425; 375/107; 364/419.19

[56] References Cited

U.S. PATENT DOCUMENTS

| | | | |
|---|---|---|---|
| 3,568,155 | 3/1971 | Abraham | 340/172.5 |
| 3,681,781 | 8/1972 | Batcher | 444/1 |
| 4,646,229 | 2/1987 | Boyle | 395/600 |
| 4,805,107 | 2/1989 | Kieckhafer et al. | 395/650 |
| 4,894,846 | 1/1990 | Fine | 395/107 |
| 4,914,586 | 3/1990 | Swinehart et al. | 395/600 |

(List continued on next page.)

OTHER PUBLICATIONS

"The Ubiquitous B-Tree", D. Comer, *ACM Computing Surveys*, Jun. 1979, pp. 121–137.

"Efficient Indexing Methods For Temporal Relations", H. Gunadhi & Arie Segev, submitted to *IEEE Transactions On Knowledge and Data Engineering* May 1990.

"A Taxonomy of Time in Databases", R. Snodgrass & I. Ahn, *ACM SIGMOD Conference*, May 1985, pp. 236–246.

"A Generalized Model For A Temporal Relational Database", S. Gadia & C. Yeung, *ACM SIGMOD Conference*, Jun. 1988, pp. 251–259.

"Logical Modeling Of Temporal Data", A. Segev & A. Shoshani, *ACM SIGMOND Conference*, Jun. 1987, pp. 454–466.

"A Temporal Model And Language For ER Databases", R. Elmasri & G. Wuu, *IEEE Data Engineering Conference*, Feb. 1990, pp. 76–83.

"Design Dbms Support For The Temporal Dimension", V. Lum, *ACM SIGMOND Conference*, Apr. 1984, pp. 115–130.

"Physical Organization Of Temporal Data", D. Rotem (List continued on next page.)

*Primary Examiner*—Thomas G. Black
*Assistant Examiner*—Paul R. Lintz
*Attorney, Agent, or Firm*—Leonard Charles Suchyta; Lionel N. White

[57] ABSTRACT

A time index for temporal databases is provided which enables the retrieval of database object versions that are valid during specified time periods. Unlike prior access and retrieval structures, the present index is based on objects whose search values are time intervals rather than time points. A series of ordered indexing points is defined by the start and end of object version intervals and these points are used to build an indexing structure, which may take the form of a B+-tree. Each leaf node entry of the B+-tree represents an indexing point and has an associated bucket of pointers which identify all object versions that are valid at that time. Storage space is reduced by including only incremental change indicators in the buckets of non-leading leaf entries and calculating needed pointers from such indicators. The time index may be employed in multi-level structures with attribute indexes to greatly improve the efficiency of temporal search operations, such as aggregate functions and temporal selection, as well WHEN and JOIN operators.

14 Claims, 5 Drawing Sheets

U.S. PATENT DOCUMENTS

| | | | |
|---|---|---|---|
| 4,989,133 | 1/1991 | May et al. | 364/200 |
| 5,058,002 | 10/1991 | Nakamura et al. | 395/600 |
| 5,089,952 | 2/1992 | Bozman | 395/725 |
| 5,093,794 | 3/1992 | Howie et al. | 364/468 |
| 5,257,365 | 10/1993 | Powers et al. | 395/600 |

OTHER PUBLICATIONS

& A. Segev, *Proceedings of IEEE Data Engineering Conference*, 1987.

"Indexing Techniques For Historical Databases", C. Kolovson & M. Stonebraker, *Proceedings Of IEEE Data Engineering Conference*, Feb. 1989, pp. 127-137.

"Spatial Kd-tree: Indexing Mechanism For Spatial Database", K. Ooi, B. McDonell, & R. Sack-Davis, *IEEE COMPSAC* 87, 1987, pp. 433-438.

Bassiouni, et al., "On The Definition and Maintainence of Database Views with Time-Varying Domains", Proc. of the 13th Annual Computer Software and Applications Conference, Sep. 20-22, 1989, pp. 201-208.

Basslouni, "A Logic For Handeling Time in Temporal Databases", Proc. IEEE COMPSAC Conf., 1988, pp. 345-352.

Korth & Silberschatz, *Database System Concepts*, McGraw-Hill, (New York, 1986), pp. 21-44, pp. 265-282.

Comer, "The Ubiquitous B-Tree" *ACM Computing Surveys*, Jun. 1979, pp. 121-137.

Gunadhi, H. & Segev, A. "Efficient Indexing Methods For Temporal Relations" Lawrence Berkeley Laboratory, Report No. CBL 28798.

TIME INDEX ACCESS STRUCTURE FOR TEMPORAL DATABASES HAVING CONCURRENT MULTIPLE VERSIONS

BACKGROUND OF THE INVENTION

Research in temporal computer databases has been mostly concerned with defining data models and operations that incorporate the time dimension. For example, extensions to the relational data model and its operations for handling temporal data have been discussed by Snodgrass and Ahn (R. Snodgrass and I. Ahn, "A Taxonomy Of Time In Databases", *ACM SIGMOD Conference*, May 1985) and Gadia and Yeung (S. Gadia and C. Yeung, "A Generalized Model For A Temporal Relational Database", *ACM SIGMOD Conference*, June 1988). In addition, some work has been presented by Segev and Shoshani (A. Segev and A. Shoshani, "Logical Modeling Of Temporal Data", *ACM SIGMOD Conference*, June 1987) and Elmasri and Wuu (R. Elmasri and G. Wuu, "A Temporal Model And Language For ER Databases", *IEEE Data Engineering Conference*, February 1990) defining temporal extensions to conceptual data models and query languages. Such temporal data models define powerful operations for specifying complex temporal queries. Although there has been some research in the area of defining storage structures and access paths for temporal data, for example by Lure (V. Lum, "Design Dbms Support For The Temporal Dimension", *ACM SIGMOD Conference*, April 1984), Rotem and Segev (D. Rotem and A. Segev, "Physical Organization Of Temporal Data", *Proceedings Of IEEE Data Engineering Conference*, 1987), and Kolovson and Stonebraker (C. Kolovson and M. Stonebraker, "Indexing Techniques For Historical Databases", *Proceedings Of IEEE Data Engineering Conference*, February 1989), these works do not provide indexing schemes for supporting high-level temporal operators such as described by Gadia et al. and Elmasri et al., cited above.

Storage techniques for temporal data, such as proposed by Lum, index or link the versions of each individual object separately. In order to retrieve such object versions that are valid during a certain time period, it has been necessary to first locate the current version of each object, and then search through the version index (or list) of each object separately. A method proposed by Rotem et al., noted above, allows a search based on time using a multi-dimensional partitioned file, in which one of the dimensions is the time dimension. However, in such a scheme temporal data items are associated with a time point rather than a time interval, and hence it is not useful when a search involving time intervals is required.

In order to conduct an efficient computer search operation in a temporal database, some effective form of indexing is required. However, since conventional indexing schemes assume that there is a total ordering on the index search values, the properties of the temporal dimension make it difficult, for a number of reasons to use traditional indexing techniques for time indexing. First, the index search values, i.e the valid—time attribute, are intervals rather than points, because each version of an object is typically valid during a time interval $[t_1,t_2]$, and the valid—time intervals of various object versions will overlap in arbitrary ways. Because one cannot define a total ordering on the interval values, a conventional indexing scheme cannot be used. Second, because of the nature of temporal databases, most updates occur in an append mode, since past versions are kept in the database. Hence, deletions of object versions do not generally occur, and insertions of new object versions occur mostly in increasing time value. In addition, the search condition typically specifies the retrieval of versions that are valid during a particular time interval.

Although the interval-based search problem is similar in many respects to the k-dimensional spatial search problem, the various index methods proposed for k-dimensional spatial search, for example by Ooi et al. (K. Ooi, B. McDonell, and R. Sack-Davis, "Spatial Kd-tree: Indexing Mechanism For Spatial Database", *IEEE COMPSAC 87*, 1987), are not suitable for the time dimension. While these spatial index methods might be adapted to a single dimension, for the most part they support spatial search for two-dimensional objects in CAD or geographical database applications. The index algorithms, such as suggested by Ooi et al., use the concept of a region to index spatial objects, wherein a search space is divided into regions which may overlap with each other, and a sub-tree in an index tree contains pointers to all spatial objects located in a region. Since spatial objects can overlap each other, handling the boundary conditions between regions is quite complex in these algorithms. In temporal computer databases there can be a much higher degree of overlapping between the valid—time intervals of object versions. For instance, a large number of long or short intervals can exist at a particular time point. Furthermore, the search space is continuously expanding whereas most spatial indexing techniques assume a fixed search space. In addition, temporal objects are appended mostly in increasing time value, making it difficult to maintain tree balance for traditional indexing trees. Thus, because of these added requirements of the temporal over the spatial search, the spatial index algorithms are not suitable for temporal data even where they are directly adapted from two dimensions to a single dimension.

SUMMARY OF THE INVENTION

The present invention provides a time indexing procedure which is particularly useful with object versioning structured temporal computer databases for the efficient processing of temporal operations requiring reference to time intervals. For example, where it is desired to retrieve object versions that are valid during a given time period, e.g. the names of all employees who worked for the company during 1985, this time index will lead directly to the desired versions, i.e. the names, without requiring the search of a version index for each individual object, i.e. employee, separately. In addition, the time index may be used to efficiently process temporal aggregate functions, as well as temporal WHEN, SELECT, and JOIN operators of Gadia et al., and temporal projection suggested in the earlier-noted work of Elmasri et al.

In a temporal database, the time dimension is usually represented, as described in Gadia et al., using the concepts of discrete time points and time intervals. A time interval, denoted by $[t_1,t_2]$, is defined as a set of time instants (points) on a scale of consecutive, regularly occurring time points, where $t_1$ is the first time instant and $t_2$ is the last time instant of the interval. The time dimension is represented as a time interval $[0,now]$, where 0 represents the starting time of a database miniworld application, and now is the current time, which is continuously expanding. The time interval between consecutive time points of a time scale may be adjusted, based on the granularity of the application, to be equal to months, days, hours, minutes, seconds, or any other suitable time unit. A single discrete time point t is usually represented as an interval [t,t], or simply [t].

The present time index may be effectively understood when viewed in connection with an underlying record-based storage system which supports object versioning, i.e. wherein records are used to store versions of objects. In addition to the regular record attributes, $A_i$, each record will have an interval attribute, valid_time, consisting of two sub-attributes $t_s$ (valid start time) and $t_e$ (valid end time). The valid_time attribute of an object version is a time interval during which the version is valid. In object versioning, a record, r, with r.valid_time.$t_e$=now is considered to be the current version of some object. However, numerous past versions of the object may also exist. These versions of an object are linked to the current version and may be recovered through the use of various known techniques, such as reverse chaining, clustering, or accession lists, which provide access to versions of a particular object through the current version of the object. Similarly, the current version of an object can be located from any other version; for example, by using a pointer to a linked list header, which in turn points to the current version.

An interval-based search operation over an object versioning record-based storage system, TDB, which consists of a collection of object versions, i.e. TDB={$e_1,e_2, \ldots ,e_n$}, may be formally defined as follows:

Given a Search Interval, $I_S=[t_a,t_b]$, find the following set of versions:

$$S(I_S) = \{e_j \in TDB | (e_j.\text{valid\_time} \cap I_S) \approx 0\}.$$

A simple but inefficient implementation of this search operation would be to sequentially access the entire storage system, TDB, using linear search, and retrieve those records whose valid_time intersects with $I_S$. Such a search would require O(N*M) accesses to the storage system, where N is the number of objects and M is the maximal number of versions per object. On the other hand, utilizing the present time index, the search would be efficiently completed with a fraction of the record accesses.

In structuring such a time index in accordance with the instant invention, a set of linearly ordered indexing points is created and maintained on the time dimension. An indexing point is specified for each time point at which the database changes with respect to a version of an object, i.e. a time point where a new version begins or a time point immediately following a version termination. This property, PR 1, of the set of all indexing points for the temporal database may be formally defined as follows:

$$BP = \{t_i \mid \exists\, e_j \in TDB\, ((t_i = e_j \cdot \text{valid\_time} \cdot t_s) \lor (t_i = e_j \cdot \text{valid\_time} \cdot t_e + 1))\}$$

Since all the indexing points $t_i$ in BP can now be totally ordered, a conventional indexing structure (B-tree, ISAM, or the like), such as the B+-tree described by Comer (D. Comer, "The Ubiquitous B-Tree", *ACM Computing Surveys*, 11(12), June 1979), is employed to index these points. In the present index structure, each leaf node entry of the B+-tree at point $t_i$ is of the form, [$t_i$,bucket], where bucket is a pointer to a bucket containing pointers to object versions. Each bucket, B ($t_i$), thus contains pointers to all object versions whose valid_time contains the interval [$t_i,t_i^+ - 1$]. This property, PR2, can be formally specified as follows:

$$B(t_i) = \{e_j \in TDB | ([t_i,\, t_i^+ - 1]) \subseteq e_j \cdot \text{valid\_time})\}$$

As a result, all object versions that are valid at a particular indexing point can be retrieved directly by means of the bucket of pointers, thereby providing the efficiency in time interval processing that has not previously been available.

THE DRAWING

The present invention will be described with reference to the accompanying drawing of which:

DESCRIPTION OF THE INVENTION

The manner of designating indexing points for the time index of the present invention may be readily seen by reference to the chart of FIG. 1 which illustrates the temporal data shown in the following EMPLOYEE table:

TABLE 1

| EMPLOYEE Table | | |
|---|---|---|
| Name | Dept | Valid_Time |
| emp1 | A | [0,3] |
| emp1 | B | [4,now] |
| emp2 | B | [0,5] |
| emp3 | C | [0,7] |
| emp3 | A | [8,9] |
| emp4 | C | [2,3] |
| emp4 | A | [8,now] |
| emp5 | B | [10,now] |
| emp6 | C | [12,now] |
| emp7 | C | [11,now] |

Figure 1:
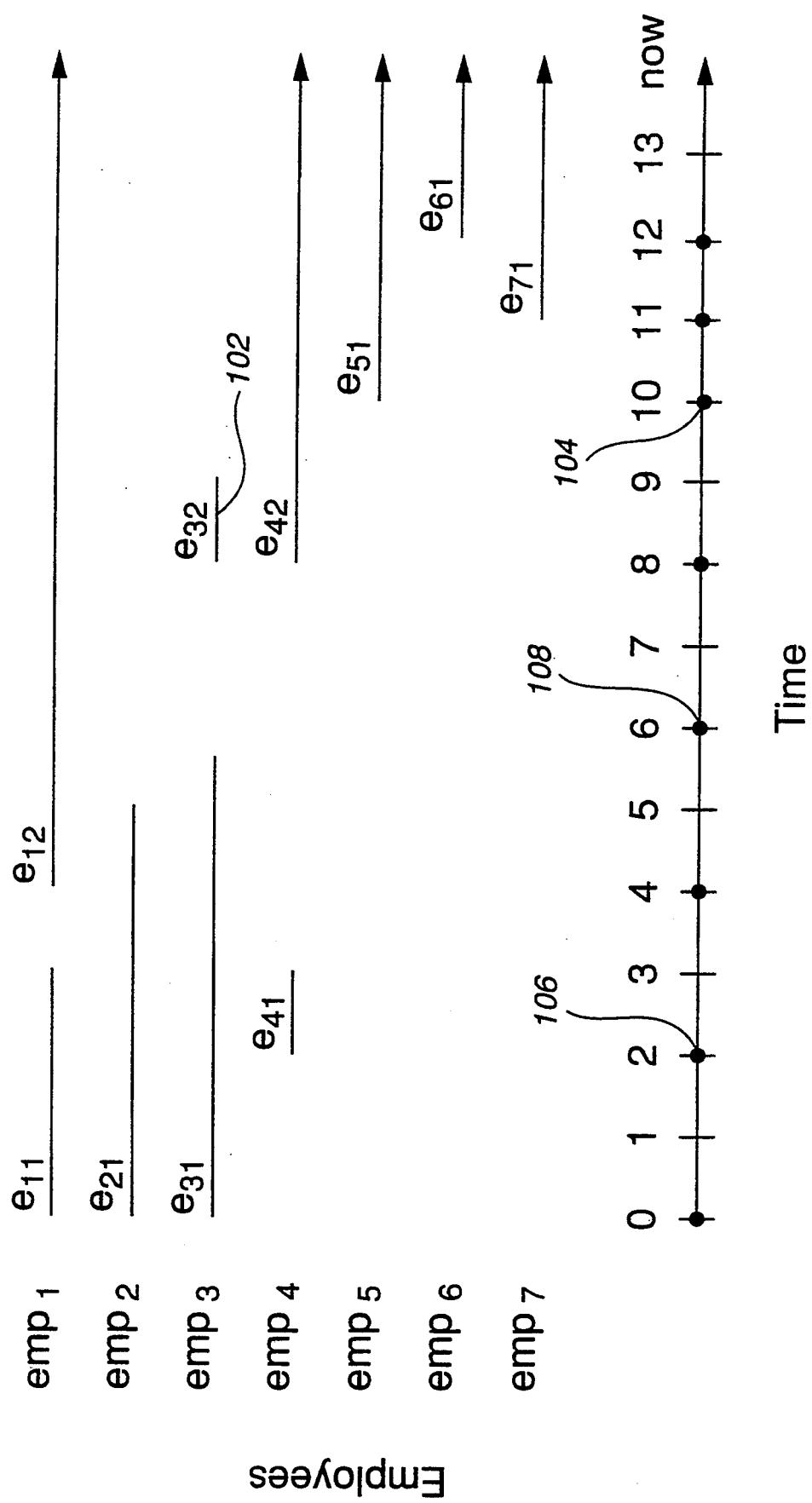
FIG. 1 is a chart of employee versions of a temporal database showing the relation of indexing points to valid_time intervals.

In FIG. 1, the intervals of valid_time during which each of the employees (emp$_1$,emp$_2$, . . . ,emp$_7$) worked in a department is shown by the horizontal lines spanning the respective intervals on the time scale. Each designation, $e_{ij}$, refers to version, j, of object, $e_i$. For example, the second employment interval, or version, 102 for employee, emp$_3$, extends from time point 8 to time point 9, i.e. valid_time is [8,9]. However, employee version, $e_{32}$, remains unchanged over this interval and it is only at the following time point 10 that there begins a changed version. As noted in the above property definition, PR1, the term, $e_j$.valid_time.$t_e$+1, designates time point 10 as an index point 104. Similarly, time point 106 2 is an index point 106, since version $e_{41}$ starts at 2; and time point 6 is an index point 108, since version $e_{21}$ terminates at 5. Thus there exist nine indexing points in BP for all employee versions in the database of Table 1, i.e. BP={0,2,4,6,8,10,11,12,now}.

In the ensuing further description of the present index structure, the following notations will be employed. Letting $t_j$ be an arbitrary time point, which may or may not be a point in BP, $t_j^-$ ($t_j^+$) is defined to be the point in BP such that $t_j^- < t_j (t_j < t_j^+)$ and there does not exist a point $t_m \in$ BP such that $t_j^- < t_m < t_j$ ($t_j < t_m < t_j^+$). In other words, $t_j^-$ ($t_j^+$) is the point in BP that is immediately before (after) $t_j$. Also, $t_j^{-=}$ is defined as follows:

1. If there exists a point $t_k \in$ BP such that $t_j = t_k$, then $t_j^{-=} = t_k$.
2. Otherwise, $t_j^{-=} = t_j^-$.

Figure 2:
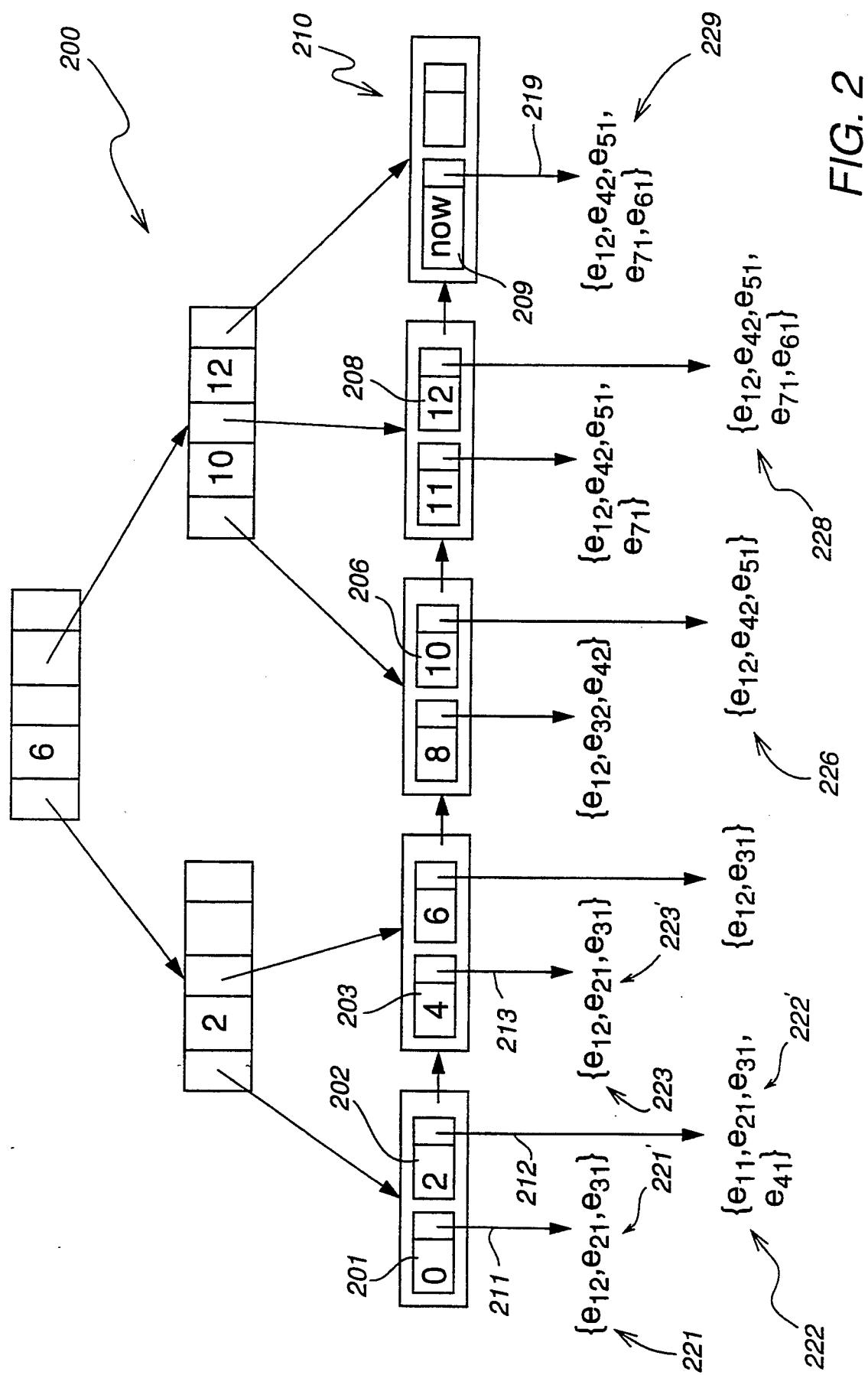
FIG. 2 shows a B+-tree time index according to the present invention.

In FIG. 2 there is depicted a B+-tree 200 which indexes the BP set of indexing points of the EMPLOYEE versions shown in FIG. 1. The B+-tree shown for this simple example is a basic first order tree in which each node contains up to two search values and three pointers. Higher order trees could, of course, be used for more extensive databases. As can be seen in FIG. 2, each of the entries 202, 202, ..., 209 of the B+-tree leaf nodes 210 is an indexing point from FIG. 1 and has a pointer 211, 212, ..., 219 to a bucket 221, 222, ..., 229 which contains pointers 221', 222', ..., to all object versions having a valid—time represented by that indexing point. The bucket at the leaf entry 203 for search indexing point 4, for instance, contains the pointers 223, to object versions, $\{e_{12}, e_{21}, e_{31}\}$, which may be seen in FIG. 1 to have a valid—time at index point 4. Thus, the specification given earlier for the property, (PR2), of a bucket indeed holds:

$$B(4) = \{e_{12}, e_{21}, e_{31}\} = \{e_j \in TDB | ([4,5] \subseteq e_j \cdot \text{valid\_time})\}.$$

In a real temporal database, there would normally be a large number of object versions in each bucket, and many of those would be repeated from the previous bucket. For example, in FIG. 2 the object version, $e_{12}$, appears in multiple consecutive buckets 223, ..., 229, since its valid—time spans indexing points, [4,now]. To reduce this redundancy and make the time index more practical, an incremental scheme is used in another embodiment of the invention. Rather than keeping a full bucket for each time point entry in BP, a full bucket is only kept for the first entry of each leaf node. Since most versions will continue to be valid during the next indexing interval, only the incremental changes are retained in the buckets of the subsequent entries in a leaf node. The incremental bucket B ($t_i$) for a non-leading entry at time point $t_i$ can be computed as follows:

$$B(t_i) = B(t_1) \cup (\cup_{t_j \in BP, t_1 < t_j \leq t_i} SA(t_j)) - (\cup_{t_j \in BP, t_1 < t_j \leq t_i} SE(t_j)),$$

where $B(t_1)$ is the bucket for the leading entry in the leaf node at which point $t_i$ is located, $SA(t_j)$ is the set of object versions whose start time is $t_j$, and $SE(t_j)$ is the set of object versions whose end time is $t_j - 1$.

Figure 3:
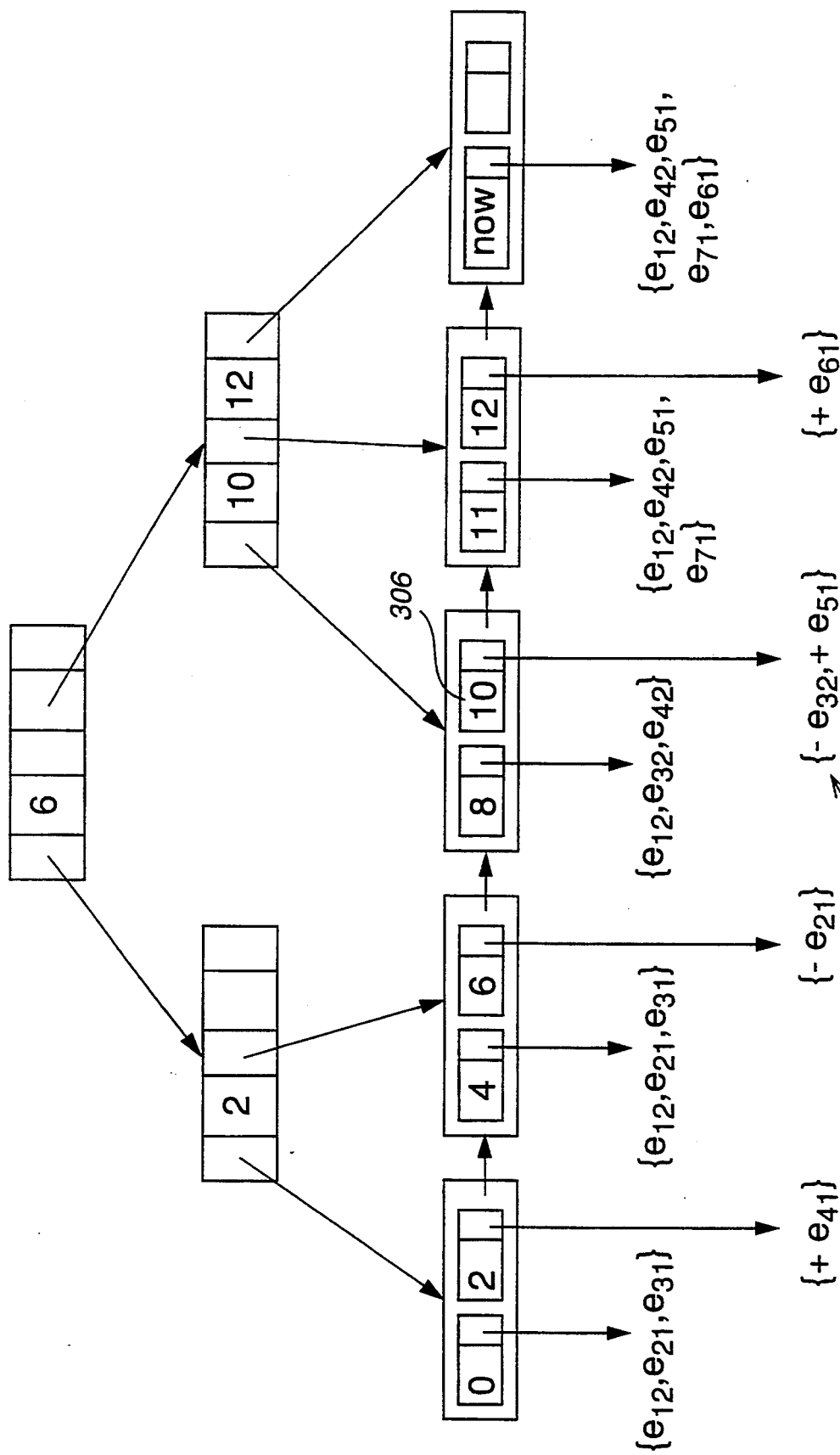
FIG. 3 shows a variant of the B+-tree time index utilizing incremental pointer buckets.

This variation in a B+-tree structure is shown in FIG. 3 where, for example, the entry at point 10 stores $\{-e_{32}, +e_{51}\}$ in its incremental bucket 326, indicating that $e_{51}$ starts at point 10 and $e_{32}$ terminates at the point immediately before point 10. The complete array of pointers at any non-leading bucket may be readily computed from the previous full and incremental buckets.

One application of the indexing method of the present invention is in a search on the B+-tree to retrieve, for example, all object versions that are valid at some point during a search interval $[t_a, t_b]$. Conducting such search for a time interval, $I_S = [t_a, t_b]$, entails a B+-tree range search to find $$PI(I_S) = \{t_i \in P | t_a \leq t_i \leq t_b\} \cup \{t_a^{-=}\}$$

and a computation to determine the resulting set $$T(I_S) = \cup_{t_i \in PI} B(T_i)$$

In this manner the index is searched to find $t_a^{-=}$, the largest indexing point that is less than or equal to $t_a$, and then the buckets are determined for all indexing points between $t_a^{-=}$ and $t_b$ inclusive. The result of the search is then the union of these buckets. In order to ensure a continued proper index function whenever the temporal database is revised, the index structure must be updated to maintain the above-noted properties, PR1 and PR2. Upon the insertion of a new object version, $e_k$, the index is revised as follows:

```
Insert(e_k)
begin
    t_a ← e_k.valid_time.t_s;
    t_b ← e_k.valid_time.t_e + 1;
    search the B+-tree for t_a;
    if (¬ found) then
                insert t_a in the B+-tree;
    if the entry at t_a is not a leading entry in a leaf node
                add e_k into SA (t_a);
    search the B+-tree for t_b;
    if (¬found) then
                insert t_b in the B+-tree;
    if the entry at t_b is not a leading entry in a leaf node
                add e_k into SE(t_b);
    for each leading entry t_l of a leaf node where t_a ≤ t_l ≤ t_b
                add e_k in B(t_l);
end
```

Although, in general, deletion of an object version is not encountered in an append-only temporal database, there may be occasions when a deletion does arise, as in the correction of an error. Maintenance of the index structure would then be effected as follows:

```
Delete(e_k)
begin
    t_a ← e_k.valid_time.t_s;
    t_b ← e_k.valid_time.t_e + 1;
    search the B+-tree for t_a;
    if the entry at t_a is not a leading entry in a leaf node
                remove e_k from SA(t_a);
    search the B+-tree for t_b;
    if the entry at t_b is not a leading entry in a leaf node
                remove e_k from SE(t_b);
    for each leading entry t_l of a leaf node where t_a ≤ t_l ≤ t_b
                remove e_k from B(t_l);
end
```

The time index can be used to efficiently process the WHEN operator with a constant projection time interval. An example of the type of query is: List the salary history for all employees during the time interval [4,5]. The result of such a query can be directly retrieved using the time index on the EMPLOYEE object versions shown in FIG. 3. A simple query such as the one given above would be very expensive to process using prior basic access structures which provide access to versions only through the current version and have no index based on time. The present time index, however, provides the capability of retrieving directly only those versions that are valid during a particular time period, without the need to search through all object versions in the database.

The present time index may also be used to efficiently process aggregate functions at different time points or intervals. In non-temporal conventional database, the aggregate functions, such as COUNT, EXISTS, SUM, AVERAGE, MIN, and MAX are applied to sets of objects or attribute values of sets of objects. For instance, they can be used to count the current number of employees or compute the current average of employees' salaries. In temporal databases, an aggregate function is applied to a set of temporal entities over an interval. For instance, the query, "GET COUNT EMPLOYEE: [3,8]", should count the number of employees at each time point during the time interval [3,8]. The result of the temporal COUNT function is a function mapping from each time point in [3,8] to an integer number that is the number of employees at that time point. Thus, the above query is evaluated to the following result if applied to the database shown in Table 1:

$$\{[3] \rightarrow 4, [4,5] \rightarrow 3, [6,7] \rightarrow 2, [8] \rightarrow 3\}$$

The time index can be readily used to process such aggregate functions. With $I_S$ being the interval over which the temporal aggregate function is evaluated, the query performs a range search to find $PI(I_S)$. Each point in $PI(I_S)$ represents a point of state change in the database. As has been earlier noted, the database mini-world changes its state at each indexing point and stays in the same state until the next change point. Therefore the aggregate function only needs to be evaluated for the points in $PI(I_S)$. The query is evaluated by applying the function on the bucket of object versions at each point. If the incremental index shown in FIG. 3 is used, the running count from the previous change point is updated at the current change point by adding the number of new versions and subtracting the number of removed versions at the change point. Similar techniques can be used for other aggregate functions that must be computed at various points over a time interval.

The indexing scheme can also be extended to support other important temporal operators, such as temporal selection. The specification of a temporal selection operator is more complex than that of a non-temporal selection. In a non-temporal database, a common form of a selection condition is to compare an attribute with a constant or with a range, for example, EMPLOYEE.Dept=B or 20K<EMPLOYEE.Salary<30K. Such conditions evaluate to a boolean value for each object. In a temporal database, however, a $\theta$ comparison condition evaluates to a function which maps from [0,now] to a boolean value. For instance, the condition, EMPLOYEE.Dept=B, when evaluated on emp₁ of FIG. 1, will have the following result:

$$\{[0,3] \rightarrow FALSE, [4,now] \rightarrow TRUE\}$$

This means that the condition is FALSE during [0,3] and TRUE during [4,now]. A complete temporal selection should specify not only a condition but also when the condition holds. For example, to select employees who had worked in department B during the time period [3,4], a SELECT condition should be specified as:

$$[EMPLOYEE.Dept=B] \cup [3,4] \neq 0$$

Figure 4:
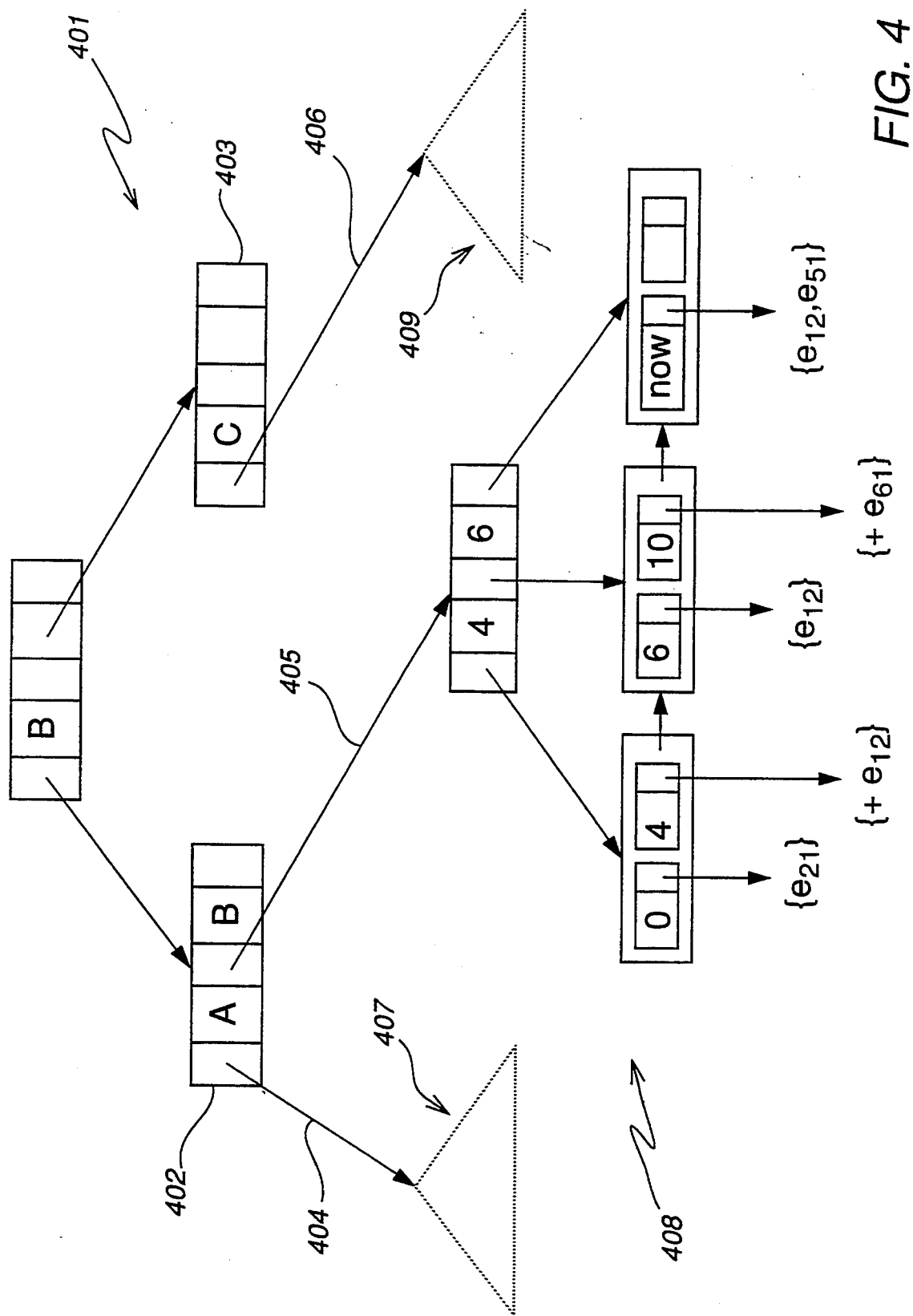
FIG. 4 shows a two-level B+-tree time index employing the present invention.

The notation [c], where c is a $\theta$ comparison condition, represents the time intervals during which c evaluates to TRUE for each object. A search for objects that satisfy such a temporal condition combines selection based on a time interval with a selection based on conditions involving attribute values. In such a search, the indexing procedure of the present invention may be combined with prior indexing methods to derive a two-level indexing scheme, such as depicted in FIG. 4. The top-level index 401 is a common B+-tree built on a search attribute; for example, the Dept attribute of EMPLOYEE in Table 1. Each leaf node entry 402, 403 of the top-level index tree includes a value of the search attribute and a pointer 404, 405, 406 to a time index 407, 408, 409 structured according to the invention. Thus, there is a time index tree for each attribute value, although for the sake of clarity only the B+-tree 408 for Dept B is shown in FIG. 4.

In processing the earlier-specified temporal SELECT condition under the two-level indexing procedure, the first step is to search the top level (the Dept attribute) index for the Dept value, B. This leads to the time index for department B, which is then searched for the time interval [3,4]. The results of the combined search is the selection of all employees who worked in department B during the time interval [3,4]. Note that each of these retrieved versions records a partial history of a selected object. However, in most temporal data models the SELECT operator should return the full set of versions (the entire history) for each selected object. Hence, it may be assumed that versions of each object will contain back pointers to access the current version as part of the basic temporal access structure. Any one of the traditional version access structures for object versions (such as clustering, accession list, or reverse chaining) can then be used to retrieve the entire version history via the current object for the selected objects.

The time index may also be used to improve the efficiency of certain temporal JOIN operations. Most prior join operations are defined for joining together a temporal object that is vertically partitioned into several relations via time normalization. For example, the attributes of temporal EMPLOYEE objects would be partitioned into several relations, where each relation would hold the primary key and those attributes (usually a single one) that are always modified synchronously. There would be a relation for EMP_SALARY, one for EMP_JOB, and so on. The EVENT JOIN is used to build back the temporal objects from the partitioned relations. The more general types of JOIN operations that correspond to the NATURAL JOIN operation of a non-temporal database could also benefit from the efficiencies of the time index. These operations join the tuples of two relations based upon an equality join condition on attribute values during a common time interval. Hence, the result of the join would include an object version whenever two object versions have the same join attribute value, and the intersection of the valid time periods during which the join attributes are equal is not empty. The valid time of the resulting join object would be the intersection of the valid times of the two joined object versions.

As an example of the JOIN application, one might execute the join operation to retrieve the time history of employees working for each department manager indicated in the following DEPARTMENT database Table:

TABLE 2

DEPARTMENT Table

| Dept | Manager | Valid_Time |
|------|---------|------------|
| A | Smith | [0,3] |
| A | Thomas | [4,9] |
| A | Chang | [10,now] |
| B | Cannata | [0,6] |
| B | Martin | [7,now] |
| C | Roberto | [0,now] |

The effect of the operation is to join each DEPARTMENT object with the appropriate EMPLOYEE objects during the time periods when the employees worked for that department. Using the described two-level time index on the Dept attribute of EMPLOYEE retrieves the employees working for each department during specific time periods. The JOIN operation would effectively be as follows:

```
for each DEPARTMENT object do
  begin
    for each version of the DEPARTMENT object to
    begin
      retrieve the Dept value, and valid_time
               [t1,t2] of the version;
      use the EMPLOYEE top-level index to locate the
               time index for the Dept value;
      use the time index to retrieve EMPLOYEE versions
               whose time interval overlaps [t1,t2];
      join each EMPLOYEE version to the DEPARTMENT
               version;
    end;
  end;
```

The result of this operation would appear as in the following Table 3:

TABLE 3

EMPLOYEE/MANAGER Table

| Name | Dept | Valid_Time | Manager |
|------|------|------------|---------|
| emp1 | A | [0,3] | Smith |
| emp1 | B | [4,6] | Cannata |
| emp1 | B | [7,now] | Martin |
| emp2 | B | [0,5] | Cannata |
| emp3 | C | [0,7] | Roberto |
| emp3 | A | [8,9] | Chang |
| emp4 | C | [2,3] | Roberto |
| emp4 | A | [8,9] | Thomas |
| emp4 | A | [10,now] | Chang |
| emp5 | B | 110,now] | Martin |
| emp6 | C | [12,now] | Roberto |
| emp7 | C | [11,now] | Roberto |

Figure 5:
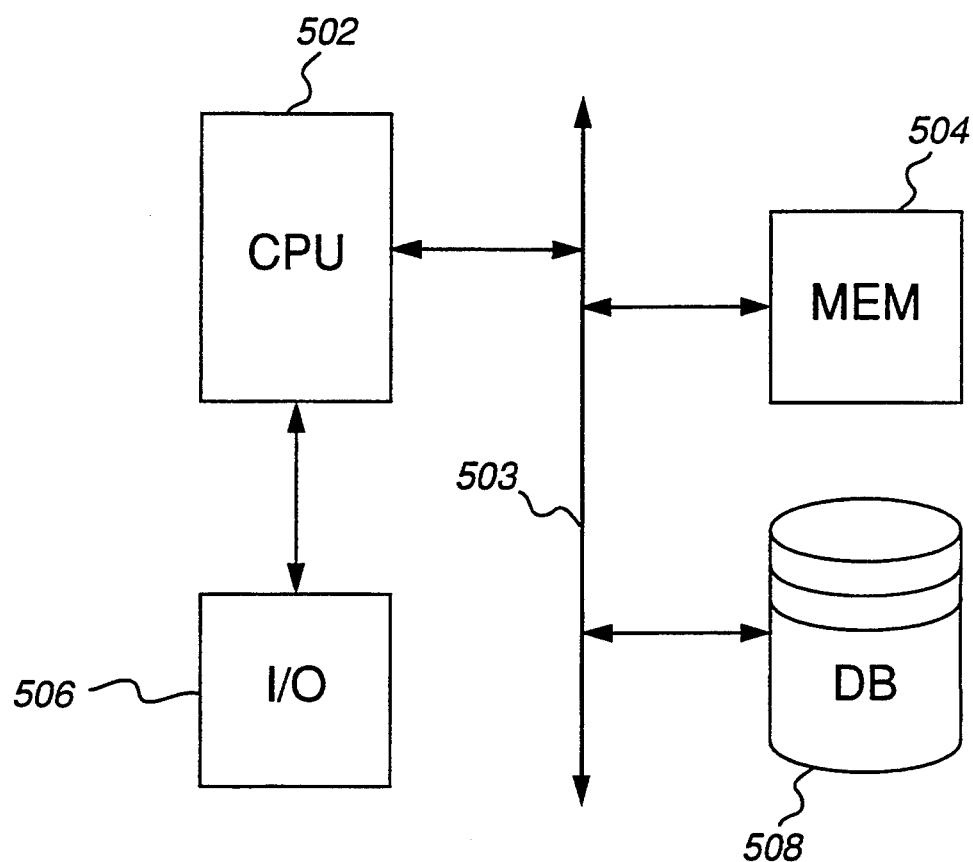
FIG. 5 shows a common computer database arrangement of the type generally contemplated for practice of the present invention.

The simple data processing computer arrangement depicted in FIG. 5 is typical of database management systems in general and is suitable for practice of the present invention. In the usual manner, the system is under the control of CPU 502 which, operating over bus 503 and utilizing application programs in memory (MEN) 504, directs the addition, deletion, search, and retrieval of data located on disks in database (DB) 508. Object version updates and searches requested at input/output means (I/O) 506, e.g., keyboard and CRT monitor screen, follow the time index structure set out in the present invention to rapidly and efficiently locate, revise, and retrieve the desired data on appropriate disks of DB 508.

A simulation of the performance of the time index was conducted in order to compare it with traditional temporal access structures. The database had 1000 objects, and versions where added based on an exponential distribution for interarrival time. New versions were assigned to objects using a uniform distribution. Objects where also inserted and deleted using an exponential distribution with a much larger interarrival time than that for version creation. The comparison of the performance of a time index was based on traditional access structures of clustering (all versions of an object are clustered on disk blocks) and using an accession list (each object has an accession list to access its versions based on time), and the number of block accesses needed for an interval query was calculated (an interval query retrieves all versions .valid during a particular time period). The results of the comparison indicated that performance for clustering and accession list deteriorates as the number of versions per object grows, whereas using a time index maintains a uniform performance.

The temporal selection query employing the two-level time index of FIG. 4 showed the most dramatic improvement over traditional access structures, since only 16 block accesses were needed compared to over 1000 block accesses with traditional structures. It was also observed that the storage requirements for the two-level index are considerably less than for a regular time index because the versions are distributed over many time trees resulting in smaller buckets for leading entries in the leaf nodes.

The procedures described and variants suggested herein for the practice of this time indexing process and the various other embodiments which will become apparent to the skilled artisan in the light of the foregoing description are all nonetheless to be included within the scope of the present invention as defined by the appended claims.

What is claimed is:

1. A computer-based temporal database management system including a time index which comprises:
   a) an ordered series of indexing time points defining time intervals during which at least one of a plurality of concurrent object version in said database is valid; and
   b) associated with each indexing point, pointer means identifying all database object versions that are valid at the time represented by said each indexing point.

2. A system according to claim 1 wherein said each indexing time point defines a change of state of said database with respect to an object version.

3. A system according to claim 1 wherein said indexing time points are situated on a scale of regularly occurring time points and represent those scalar time points:
   a) at which a database object version begins; and
   b) next following the scalar time point at which a database object version terminates.

4. A system according to claim 1 wherein said indexing time points populate the leaf nodes of a B+-tree index structure.

5. A system according to claim 4 wherein each said indexing time point has an associated pointer to a bucket of pointers identifying said valid database object versions.

6. A system according to claim 5 wherein each said valid database object version is identified by a bucket pointer.

7. A system according to claim 5 wherein the bucket pointers of selected indexing points identify only beginning and terminating database object versions.

8. A method for structuring a time index in a computer-based temporal database management system which comprises:
   a) assembling in computer memory an ordered series of indexing time points defining time intervals during which at least one of a plurality of concurrent object version in said database is valid; and
   b) associating with each indexing point pointer means identifying all database object versions that are valid at the time represented by said each indexing point.

9. A method according to claim 8 which further comprises selecting as said indexing time points those points on a scale of regularly occurring time points that define a change of state of said database with respect to an object version.

10. A method according to claim 9 which comprises selecting time points:
   a) at which a database object version begins; and
   b) next following the scalar time point at which a database object version terminates.

11. A method according to claim 8 wherein said assembling comprises inserting said indexing time points as the population of the leaf nodes of a B+-tree index structure.

12. A method according to claim 11 which further comprises associating with each said indexing time point a pointer to a bucket of pointers identifying said valid database object versions.

13. A method according to claim 12 which further comprises associating with said time index B+-tree, by means of a leaf node pointer therefrom to said time index B+-tree, a higher level B+-tree index of database attributes related to the time interval object versions of said database.

14. A method according to claim 12 which further comprises, upon inserting in said database a new object version whose time interval extends from a first time point to a second time point:
   a) if there exists no indexing point at said first time point, creating an indexing point at said first time point and creating a pointer bucket for said indexing point;
   b) if there exists no indexing point at the next scalar time point following said second time point, creating an indexing point at said next time point and creating a pointer bucket for said indexing point; and
   c) inserting a pointer to said new object version in the bucket for the indexing point at said first time point and in the buckets for all subsequent indexing points prior to said second time point.

* * * * *